United States Patent
Smolders et al.

(10) Patent No.: US 6,481,924 B1
(45) Date of Patent: Nov. 19, 2002

(54) SLIP-FORM PAVER

(75) Inventors: Raymond Smolders, Herentals (BE); Holger Thieme, Kalenborn (DE)

(73) Assignee: Wirtgen GmbH, Windhagen (DE)

( * ) Notice: Subject to any disclaimer, the term of this patent is extended or adjusted under 35 U.S.C. 154(b) by 0 days.

(21) Appl. No.: 09/716,364

(22) Filed: Nov. 21, 2000

(30) Foreign Application Priority Data

Nov. 26, 1999 (DE) .......................... 199 57 048

(51) Int. Cl.$^7$ .............................. E01C 19/12; B62D 5/00
(52) U.S. Cl. ..................................... 404/105; 180/408
(58) Field of Search .............................. 404/105, 101; 180/408, 426, 439; 280/86

(56) References Cited

U.S. PATENT DOCUMENTS

| | | | | |
|---|---|---|---|---|
| 3,330,188 A | * | 7/1967 | Layton | 404/104 |
| 3,540,359 A | * | 11/1970 | Swisher, Jr. et al. | 198/861.1 |
| 3,710,695 A | * | 1/1973 | Miller et al. | 180/434 |
| 3,970,405 A | * | 7/1976 | Swisher et al. | 404/105 |
| 4,120,507 A | * | 10/1978 | Miller | 180/41 |
| 4,197,032 A | * | 4/1980 | Miller | 172/108 |
| 4,493,586 A | * | 1/1985 | Miles et al. | 405/15 |
| 4,778,305 A | * | 10/1988 | Ritchey et al. | 404/101 |
| 4,789,266 A | * | 12/1988 | Clarke et al. | 404/104 |
| 5,127,335 A | * | 7/1992 | Whitaker, Jr. | 104/3 |
| 5,590,977 A | * | 1/1997 | Guntert et al. | 404/101 |
| 5,615,972 A | * | 4/1997 | Guntert et al. | 404/101 |
| 5,647,688 A | * | 7/1997 | Guntert et al. | 280/638 |

FOREIGN PATENT DOCUMENTS

WO WO99/50503 10/1999

\* cited by examiner

*Primary Examiner*—Gary S. Hartmann
(74) *Attorney, Agent, or Firm*—Diller, Ramik & Wight (57) ABSTRACT

In a slip-form paver comprising a machine frame (4) including longitudinal beams (8) extending in parallel to the working direction, and transverse beams (18,20), and comprising a chassis (2) including a plurality of truck assemblies (14,15) adjustable in height by means of a lifting column (10) and carrying steerable tracks (16) maintaining the plane of the machine frame (4) in a predetermined position, it is provided that a slidable traverse member (22) is mounted to at least one transverse beam (20) of the machine frame (4) in a manner allowing for displacement transversely to the working direction, and that the front truck assemblies (14) are mounted on the slidable traverse member (22).

22 Claims, 6 Drawing Sheets

SLIP-FORM PAVER

The present invention relates to a slip-form paver and a truck assembly for a construction machine.

BACKGROUND OF THE INVENTION

Slip-form pavers of the above type are used, for instance, to produce road surfaces from concrete or to produce channels, guiding walls or water grooves from concrete laterally of the roadway. Known slip-form pavers have a machine frame with a chassis comprising a plurality of truck assemblies provided with steerable tracks and with lifting columns. The machine frame is adapted for attachment of various working devices for spreading or leveling and forming the concrete.

A generic slip-form paver is known e.g. from DE 198 14 052 A.

It is an object of the invention to provide a slip-form paver of the above type which is improved with respect to stability, traction, directional accuracy and maneuverability when used for offset molding.

The above object is solved by a slip-form paver comprising the features indicated in the present application.

According to the instant invention, it is advantageously provided that at least one transverse beam of the machine frame has a slidable traverse member arranged thereon to be moved transversely to the working direction, and that the truck assemblies are attached on said slidable traverse member instead of the machine frame.

In an arrangement for offset melding, the concrete molds are attached on the sides of the slip-form paver. Since the working tools required for the construction task, e.g. concrete molds, are used laterally of the slip-form paver, considerable yawing moments tend to act on the machine frame of the slip-form paver, thus impairing its stability, traction and directional stability. The invention makes is possible that, in offset molding, a track can be arranged next to the outer side—extending laterally of the machine frame—of the path to be formed. In this manner, the machine frame is given a more stable support relative to forces acting thereon and is held with directional stability. By means of the slidable traverse member, the track position can be adjusted within a wide range so that the width of an obstacle, e.g. a protruding concrete reinforcement or a water ditch, is without problems allowed to amount e.g. up to two meters laterally of the slip-form paver. Up to a width in this range, the truck assembly can also be used beyond the obstacle.

Thus, the slip-form paver according to the invention is adaptable with utmost flexibility to different offset molding requirements and can be very expediently adjusted to a given offset molding requirement.

At least the leading or front truck assemblies in the moving direction can be adjusted in their track width so that, in combination with the above mentioned displacement of the track position, the truck assemblies can be positioned with extreme flexibility. This allows for an adjustment of the track width to the working width of the working devices between the front and rear truck assemblies while also improving the stability of the slip-form paver.

According to a preferred embodiment of the invention, the slidable traverse member carries a pivoting device which is pivotable in the plane of the machine frame and is provided to have a conveyer means attached thereto. Such an arrangement of the pivoting device offers the advantage that no conversion is required when the truck assemblies have to be brought into another track position, since the conveyer means is moved along with the slidable traverse member. This made possible because the mutual attachment is generally provided between the chassis units, and advantageously safeguards that no additional yawing forces from the conveyer means will act on the machine frame. The pivoting device further yields the advantage that the conveyer means can be pivoted to the required site within the desired track position.

Additionally, it can be provided that the pivoting device of the conveyer means is arranged on the slidable traverse member for displacement transversely to the working direction. This option further increases the flexibility of the conveyer means and enlarges the setting range, e.g. the working range of the conveyer means.

The conveyer means is supported on the free end of the pivoting device, which device preferably comprises a parallelogram guiding means, for pivoting movement about an axis extending orthogonally to the plane of the machine frame. Further, it can be provided that the conveyer means, for adjustment of its angle of inclination, is supported to be pivoted about an axis in parallel to the plane of the machine frame. In this manner, the conveyer means can be pivoted, in addition to the pivoting movement through the pivoting device, both laterally relative to the working direction and with respect to the angle of inclination.

According to a particularly preferred embodiment, the free end of the pivoting device is provided with an auxiliary frame in which the conveyer means can be displaced in a linear sliding movement in the longitudinal direction, thus offering an additional possibility for positioning the conveyer means.

The machine frame can be provided, at least on one side, with an auxiliary frame which is telescopically adaptable transversely to the working direction and is provided to accommodate working devices. This auxiliary frame is suited for attachment of e.g. concrete molds to be used in offset molding for the forming of monolithic profiles in numerous different shapes and sizes.

Below the machine frame, an intermediate frame can be arranged. This intermediate frame can be pivotable by at least 180° about a central axis extending orthogonally to the machine frame. In this manner, adjustment means provided in the intermediate frame and arranged to be telescoped transversely to the working direction, can be made available on both sides of the machines by pivoting the intermediate frame by 180°.

For instance, using the adjustment means, the auxiliary frame can be telescoped out of the intermediate frame. By pivoting the intermediate frame by 180°, the auxiliary frame can be quickly made available on the other side of the machine without extensive conversion procedures.

Further, it can be provided that the position of the intermediate frame is adjustable relative to the machine frame in parallel to the longitudinal beams. Also in this case, the positioning of working devices can be performed without complex conversion procedures.

At least the leading truck assemblies in the working direction are provided with a steering gear mechanism for pivoting the tracks, wherein the steering angle, to be set relative to the central position in the working direction, is larger than an amount of ±50° to 60°, preferably ±75°.

Such a steering angle allows for particularly narrow curve radii, e.g. when in offset molding the offset mold has been mounted on the right side and the moving path will take a curve to the left. In this case, the slip-form paver must follow a particularly narrow inner curve.

For such purposes, the steering gear mechanism comprises two links preferably curved in a circular shape and provided to be moved in a moving plane extending orthogonally to the axis of the lifting column.

Particularly the radius of curvature of the links is adapted to the diameter of the lifting column for the truck assembly, so that, in one end position of the stearing gear mechanism, the links will tightly enclose the lifting column.

The adjustment device of the steering gear mechanism is provided as a piston-cylinder unit comprising a cylinder housing and a piston rod arranged for linear movement in the cylinder housing.

Respectively one end of the two links is coupled to a respective end of the other link via a common joint on the free end of the piston rod, while the other end of the first link is coupled to a second joint with is stationary relative to the truck assembly and the other end of the second link is coupled to a third joint which is stationary relative to the track.

The cylinder housing of the piston-cylinder unit is pivotable about an axis extending in parallel to the axis of the lifting column and is supported on a member which is stationary relative to the lifting column and the truck assembly, respectively.

An embodiment of the invention will be explained in greater detail hereunder with reference to the accompanying drawings.

BRIEF DESCRIPTION OF THE DRAWINGS

FIGS. 5a and 5b are views illustrating different steering positions of the steering gear mechanism.

DETAILED DESCRIPTION OF A PREFERRED EMBODIMENT

Figure 1:
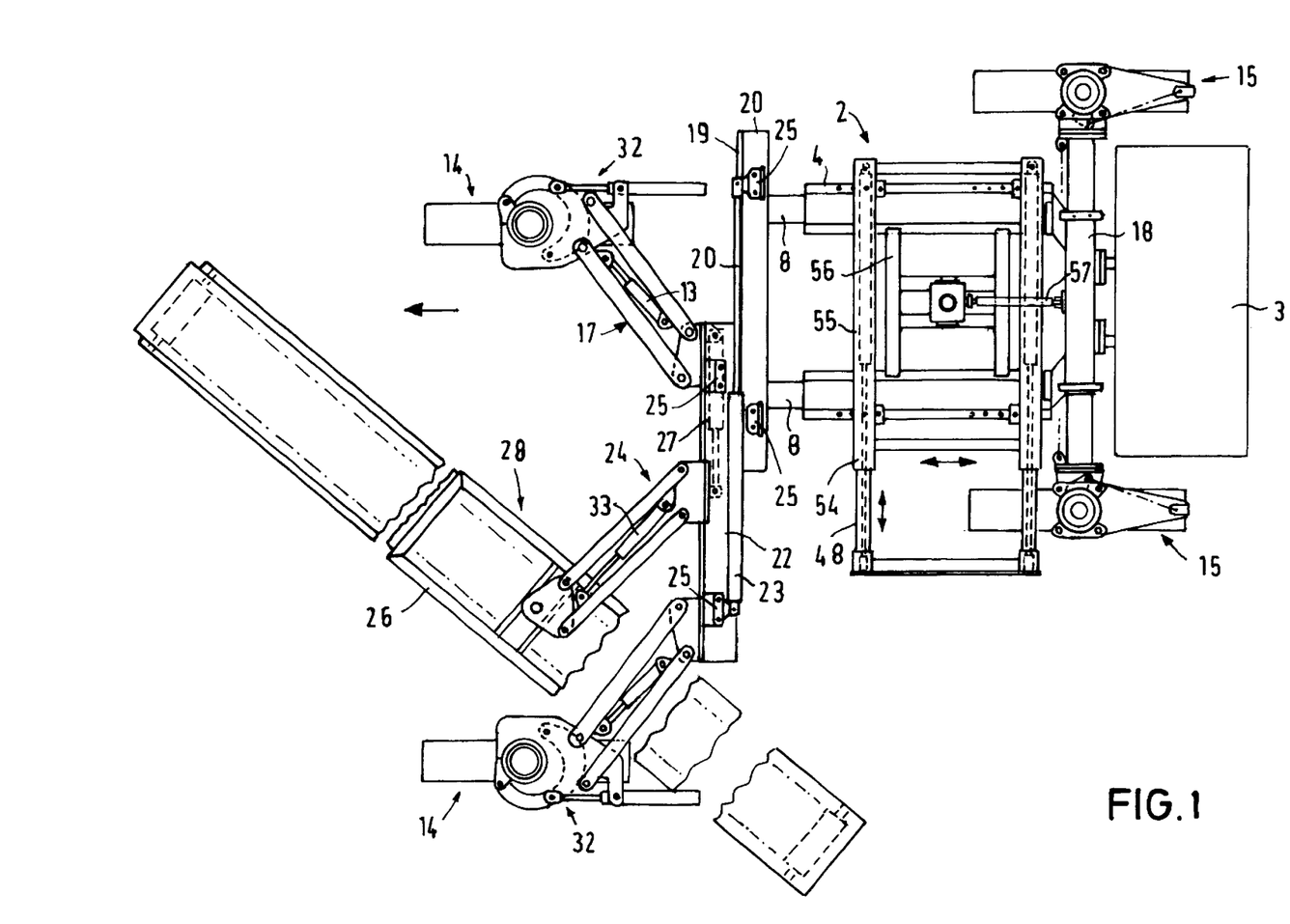
FIG. 1 is a plan view of the slip-form paver.

As illustrated in FIG. 1 the slip-form paver comprises a chassis 2 including a machine frame 4 with longitudinal beams 8 extending in parallel to the working direction and arranged to be telescoped from machine frame 4 and with transverse beams 18,20 extending transversely to the working direction. The working direction is indicated by an arrow in FIG. 1. The rear transverse beam 18 in the working direction is rigidly connected to machine frame 4 and in two vertically displaced planes has rear truck assemblies 15 received therein, which are arranged to be telescoped from transverse beam 18 transversely to the working direction. Behind the transverse beam 18 in the working direction, machine frame 4 has a drive unit 3 connected thereto, generating a hydraulic driving force for the advance movement and for the adjustment means of the slip-form paver.

The front transverse beam 20 in the working direction is rigidly connected to the telescoping longitudinal beams 8 which can be telescoped out of machine frame 4 in the working direction so that, if required, the distance between the leading truck assemblies 14 and the trailing truck assemblies 15 can be changed to thus change the overall length of the slip-form paver. The machine frame 4 and the longitudinal beam 8, respectively, do not need an adjustment device for this purpose since the extending or shortening of the machine frame 4 can be performed solely by means of the truck assemblies 14,15. A safety chain or safety tow between the rear transverse beam 18 and the front transverse beam 20 can be provided to prevent a too long telescoping movement of the longitudinal beams 8. When the longitudinal beam 8 have taken their correct positions, they will be secured in machine frame 4 by means of bolts.

Figure 3:
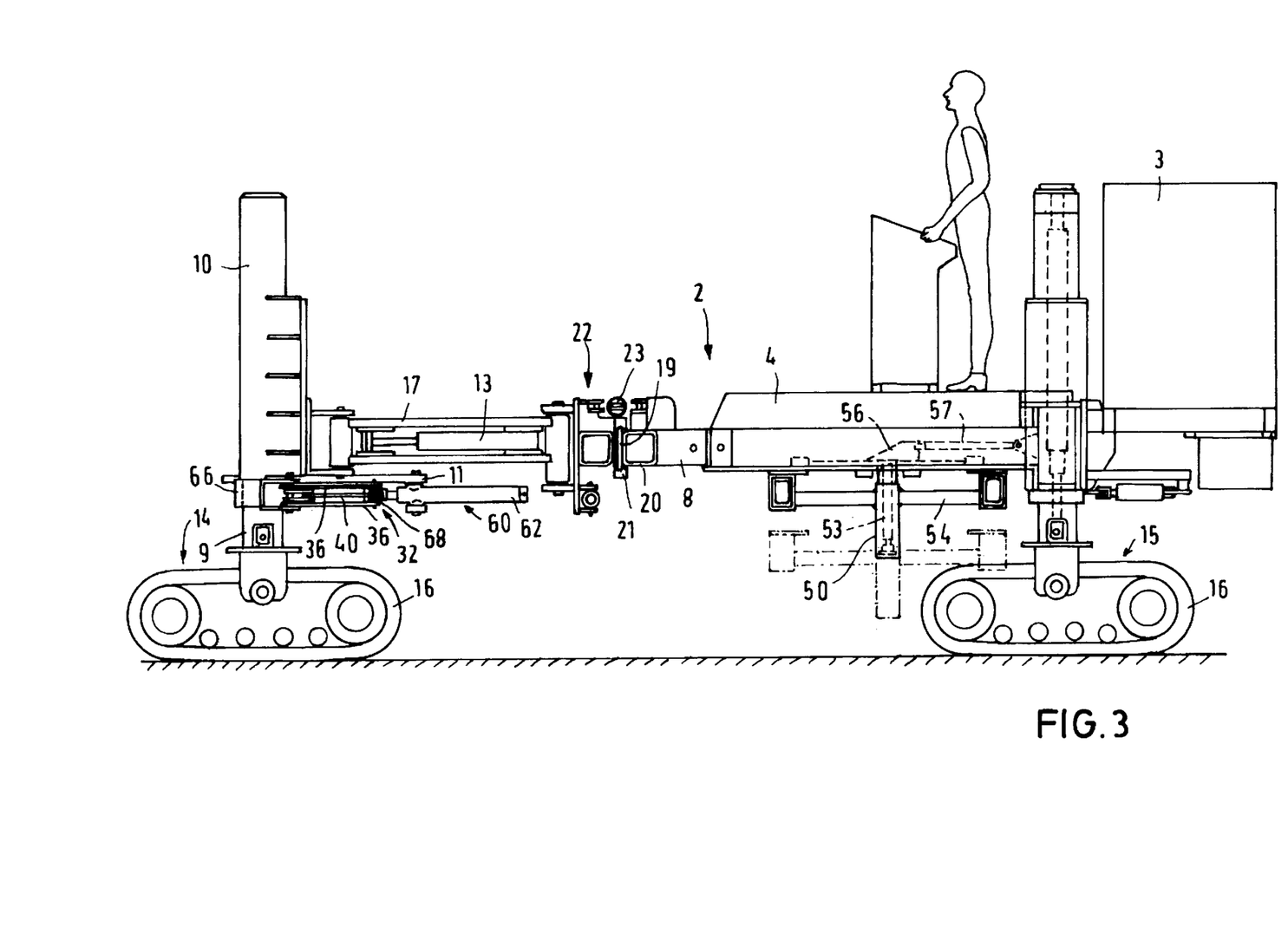
FIG. 3 is a side view of the slip-form paver without the conveyer means.

The machine frame 4 can further comprise an intermediate frame 54 arranged below machine frame 4 and provided with a telescoping auxiliary frame 48 displaceable transversely to the working direction. The intermediate frame 54 is connected to a slide unit 56 which, by means of a piston-cylinder unit 57, can be reciprocated in the working direction so that the position of the intermediate frame 54 with the auxiliary frame 48 can be changed relative to the machine frame 4.

Using the auxiliary frame 48, working devices such as e.g. concrete molds for offset molding can be laterally mounted to the machine and variably positioned as desired. The intermediate frame 54 comprises square profiles having piston-cylinder units 55 fastened therein for telescoping the auxiliary frame 48.

Figure 2:
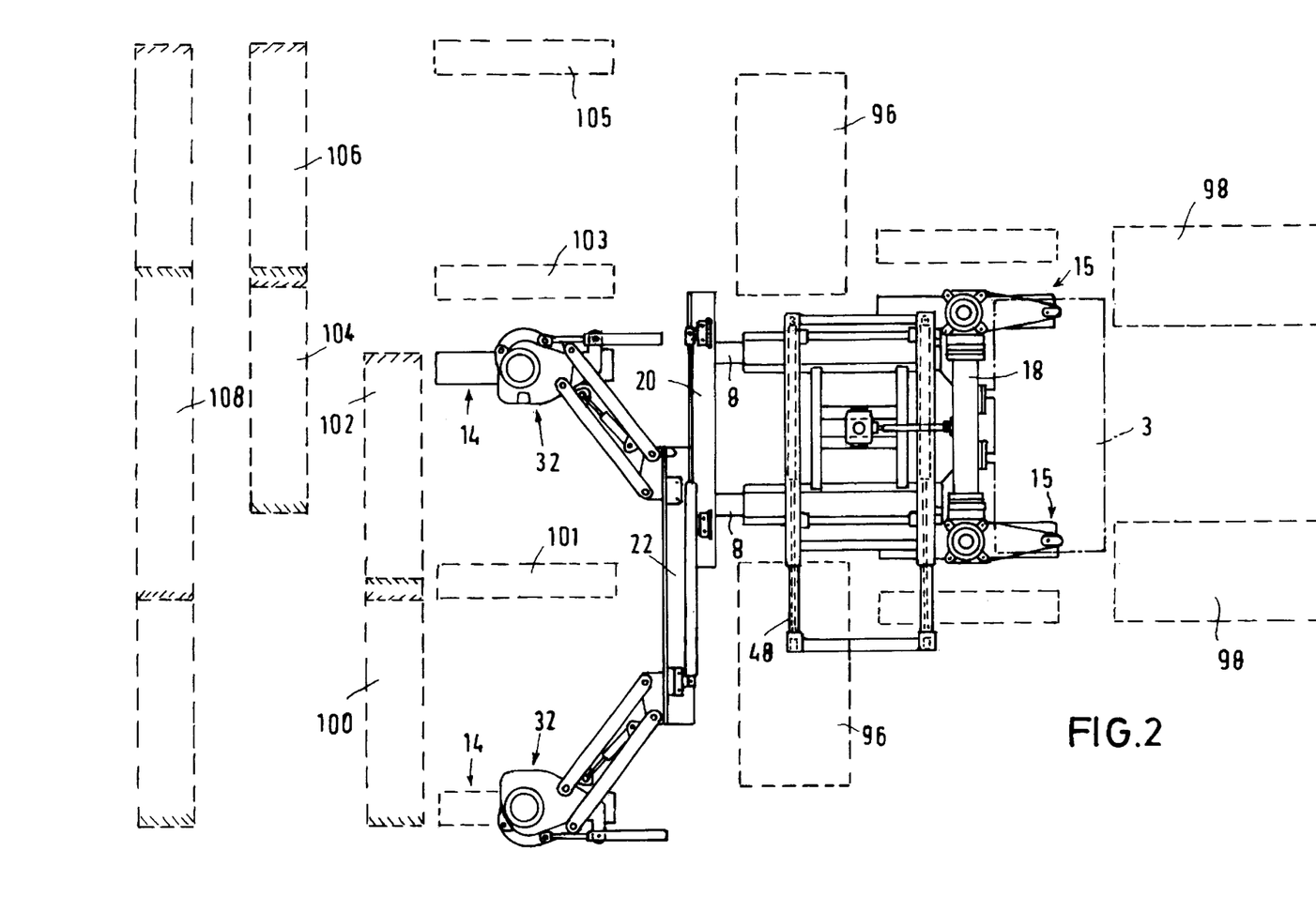
FIG. 2 is a plan view of the arrangement according to FIG. 1 wherein the setting ranges for the track position of the truck assemblies are schematically indicated.

In FIG. 2, the schematically outlined areas 96 indicate the maximal width available for lateral molding. FIG. 2 further illustrates the setting ranges 98 for the rear truck assemblies 15 to be telescoped in the transverse direction. The maximum molding width laterally of machine frame 4 is obtained when the respective rear truck assembly 15 is arranged in its position closest to machine frame 4 and the respective front truck assembly 14 is arranged in its most remote position relative to machine frame 4.

To be able to use the auxiliary frame 48 also on the opposite side of machine frame 4, the intermediate frame 54 can be lowered and be pivoted by 180°. To lower the intermediate frame 54, use can be made of a piston-cylinder unit 53 positioned in a lifting column 50 which, in a manner allowing rotation thereof together with intermediate frame 54, is mounted to the slide unit 56 arranged for linear displacement in the working direction. Upon attaining its working position, intermediate frame 54 can be fixed to machine frame 4 e.g. by screws.

On the front transverse beam 20 in the working direction, a slidable traverse member 22 is arranged which by means of a piston-cylinder unit 23 can be displaced in parallel to transverse beam 20. For this purpose, slidable traverse member 22 is formed with a C-profile 21 arranged to grip a rail 19 provided on the front side of transverse beam 20. As evident from FIG. 1, transverse beam 20 in regions close to its free ends is formed with respectively one connecting flange 25 for the piston-cylinder unit 23. Also the slidable traverse member 22 has its free ends provided with respective connecting flanges 25; as FIG. 1 illustrates, for displacing the slidable traverse member 22 to the left relative to the working direction, the cylinder housing of piston-cylinder unit 23 is mounted to the left connecting flange 25 of slidable traverse member 22 while the free end of the piston of piston-cylinder unit 23 is mounted to the right-hand connecting flange 25 of transverse beam 20.

If the slidable traverse member 22 is to be displaced from its central position to the right relative to the working direction, use can be made of the same piston-cylinder unit 23 when the cylinder housing of piston-cylinder unit 23 has been mounted to the left connecting flange 25 of transverse beam 20, and the free end of the piston rod of piston-cylinder unit 23 has been mounted to the right-hand connecting flange of slidable traverse member 22.

In the central position of the slidable traverse member 22 relative to the transverse beam 20, the connecting flanges 25 of slidable traverse member 22 and of transverse beam 20 are arranged opposite to each other so that an adaptation of the piston-cylinder unit 23 can be performed very quickly. Such adaptation will be required only when an offset molding process is to be performed on the other side of the slip-form paver.

The front truck assemblies 14 are articulated to the outer ends of slidable traverse member 22 by means of a respective pivoting device 17 configured in the manner of a parallelogram. The pivoting devices 17 with the associated piston-cylinder units 23 allow for the setting of different track widths between the two front truck assemblies 14 while the track position can be varied by means of the slidable traverse member 22.

In FIG. 2, the setting ranges for the track position of the front truck assemblies 14 are schematically outlined. If the slidable traverse member 22 as shown in FIG. 2 has been arranged on the left side relative to the working direction and to the transverse beam 20, the setting range for the left truck assembly 14 is the range marked by reference numeral 100, and the setting range for the right truck assembly is the range 102. Further, with the slidable traverse member 22 arranged in its left position, the outermost left position 101 of the right-hand truck assembly 14 is indicated in interrupted lines.

The ranges marked by 104 and 106 are the setting ranges for the left and the right truck assembly 14, respectively, when the slidable traverse member 22 is arranged on the right side. The appertaining outermost right position of the left truck assembly 14 is marked by the position 103 in FIG. 2 while the outermost right position of the right truck assembly 14 is marked by the position 105 in FIG. 2. The foremost range 108 in the working direction is the overall range within which the track position of the front truck assemblies 14 can be set.

Figure 4:
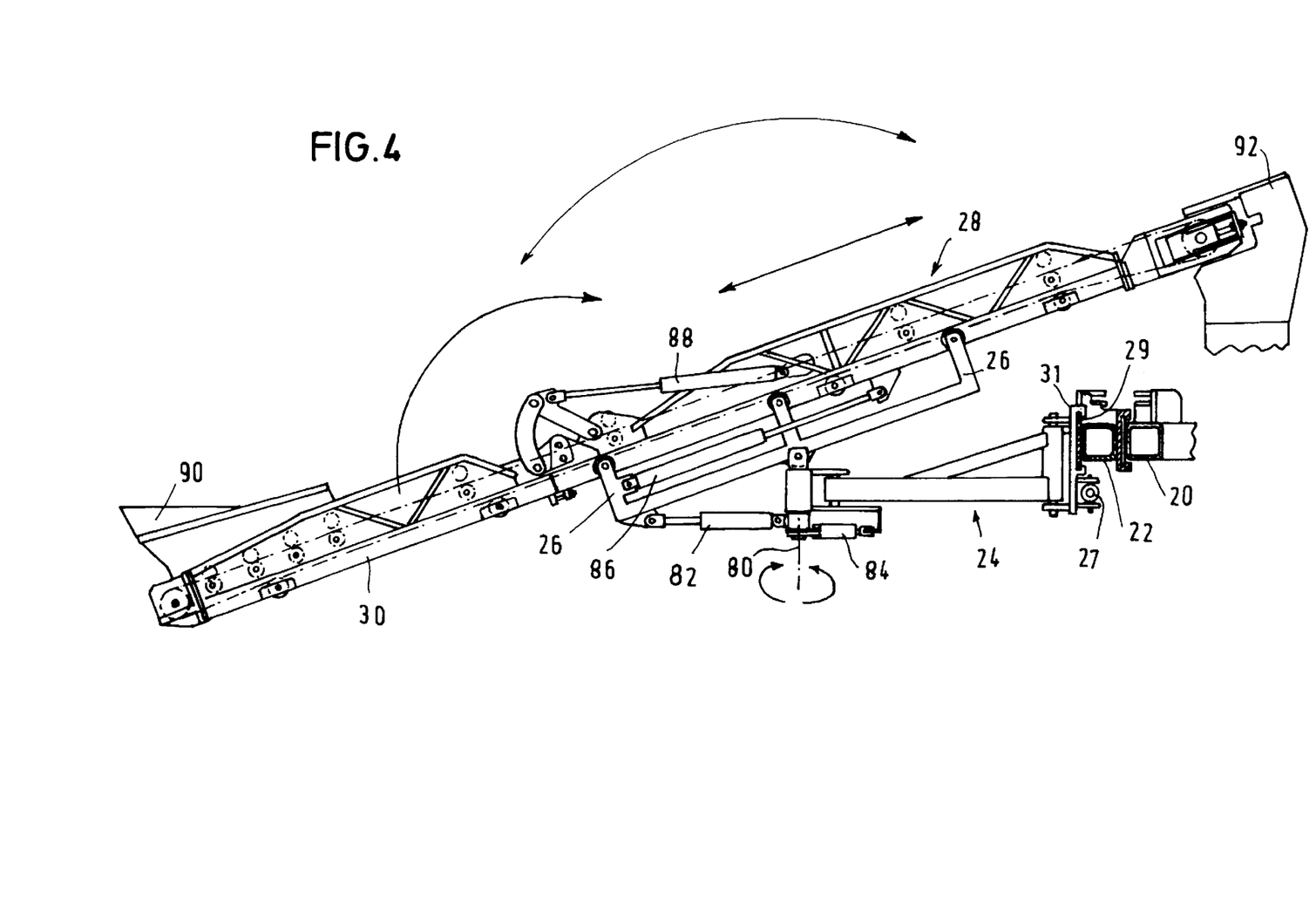
FIG. 4 is a view of the conveyer means arranged for displacement on a slidable traverse member.

Further, the slidable traverse member 22 has a third parallelogram-like pivoting device 24 arranged thereon, which on its free end carries a conveyer means 28, e.g. a conveyer belt. By means of a piston-cylinder unit 27, the pivoting device 24 can be displaced relative to slidable traverse member 22 in transverse direction relative to the working direction so as to move the conveyer means 28 into a desired position. A detailed view of conveyer means 28 is shown in FIG. 4.

The pivoting device 24 is provided with a C-profile 31 for gripping a rail 29 extending along slidable traverse member 22, and is arranged to be disposed along rail 29 transversely to the working direction by means of the piston-cylinder unit 23.

Pivoting device 24 comprises two parallel links which are pivotable by a piston-cylinder unit 33 in manner similar to that described in connection with the pivoting devices 17 for the truck assemblies 14. Arranged on the free end of pivoting device 24 is an auxiliary frame 26 which can be rotated about an axis 80 extending orthogonally to machine frame 4 and whose angle of inclination can be adjusted by means of a piston-cylinder unit 82. In the presently described embodiment, the conveyer means 28 comprises a conveyer belt which on the auxiliary frame 26 can be moved for linear displacement in its longitudinal direction by means of a piston-cylinder unit 85. Using a piston-cylinder unit 88, the lower portion 30 of conveyer means 28 can be folded by approximately 180° into a transport position. The conveyer means has an infeed hopper 90 arranged on its lower end and a discharge hoper 92 on its upper end.

Figure 5:
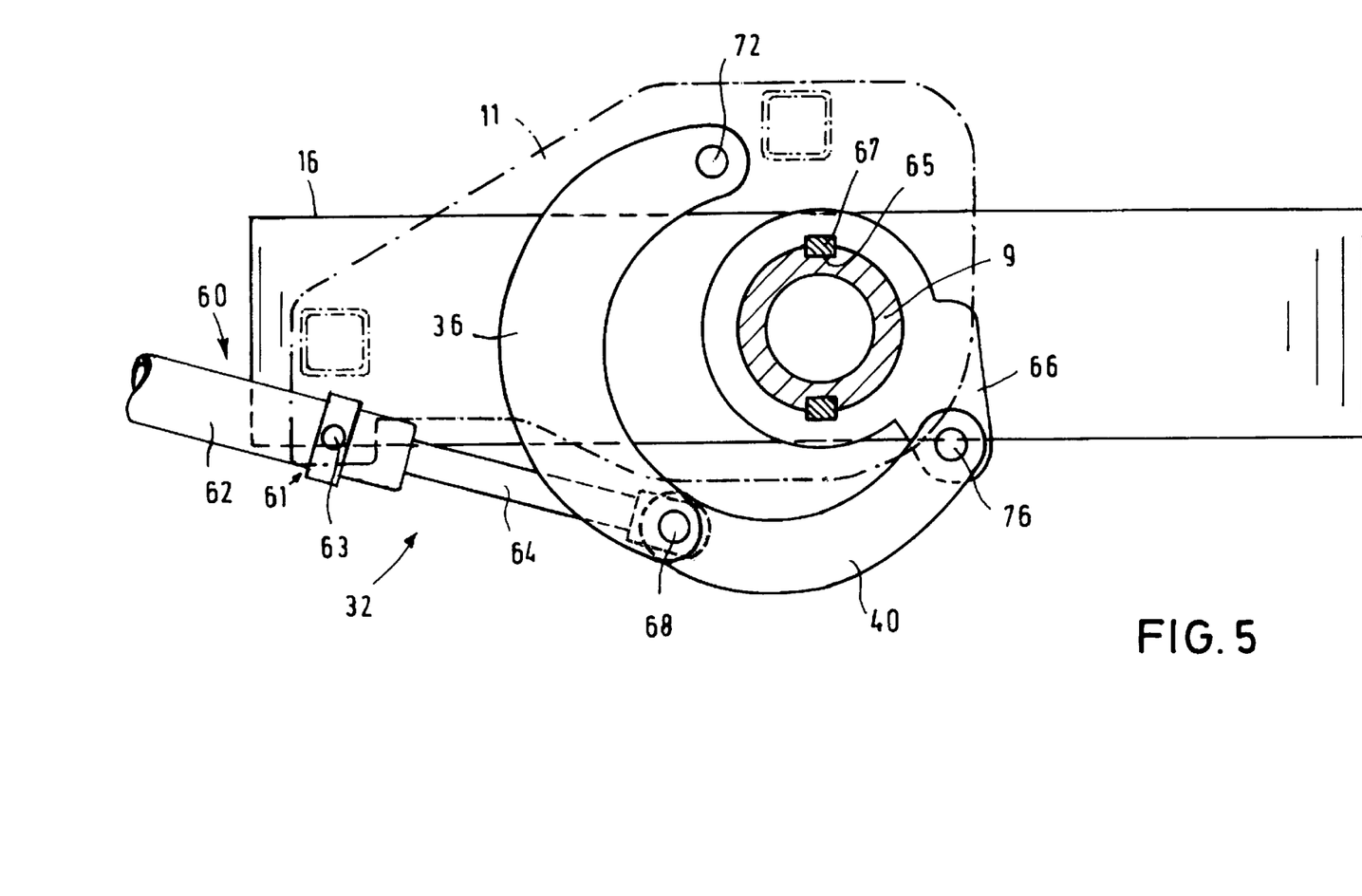
FIG. 5 is a view a steering gear mechanism for the tracks.

While the rear truck assemblies are provided with a conventional steering gear mechanism, the front truck assemblies 14 are provided with a steering gear mechanism 32 allowing for a maximum angle of turn of more than ±75° from the central position in the working direction. Each truck assembly 14 comprises a lifting column 10, form which a track 16 can be extended in downward direction orthogonally to machine frame 4. The extendable portion 9 of lifting column 10 is surrounded by a steering ring 66 actuated by steering gear mechanism 32.

The steering gear mechanism 32 comprises a piston-cylinder unit 60 including a cylinder housing 62 and a piston rod 64 arranged to act on at least two links 36,40 whose shape is curved along the contour of a circle. Cylinder housing 62 is articulated, in a manner allowing for movement about an axis 63 extending orthogonally to machine frame 4, to a lifting column flange 11 connected to lifting column 10. The pivot joint 61 in this arrangement is located on the end of cylinder housing 62 facing towards piston rod 64. Provided on the free end of piston rod 64 is a first joint 68 by which the link 40 connected to steering ring 66, the head of piston rod 64 and one end of link 36 are connected to each other. Link 36 can be provided as an arrangement of two links, wherein, within the joint, 68 link 40 is arranged between links 36. The free end of the links 36 is attached to the lifting column flange 11 by a second joint 72 arranged in a fixed position relative to the lifting column 10, while the free end of link 40 is coupled to steering ring 66 via a third joint 76. The link mechanism 32 is moved in a plane extending orthogonally to the axis of lifting column 10.

Steering ring 66 comprises two diametrically opposite groove-guided blocks 67 arranged in a groove on the inner periphery of steering ring 66 while projecting radially inwardly and engaging corresponding longitudinal grooves 65 of the lower portion 9 of lifting column 10. This arrangement makes it possible to steer the track 16 independently of the height setting of track 16.

FIGS. 5, 5a, 5b illustrate different positions of link mechanism 32 and the correspondingly set maximum angle of turn of track 16.

FIG. 5 shows the central position during straight-lined travel in parallel to the longitudinal beams 8 of machine frame 4.

FIG. 5a shows a maximum angle of turn of the track 16 to the right, with the curved links 36,40 tightly enclosing the lower portion 9 of lifting column 11. In this constellation, piston rod 64 is in its retracted position.

FIG. 5b shows a maximum angle of turn to the left, with piston rod 64 arranged in its extended position.

FIGS. 5a and 5b particularly demonstrate the enlarged maximum angle of turn in comparison to the usual maximum angles of turn from ±25 to 30°. As a result of the thus considerably enlarged range of the maximum angles of turn, the instant slip-form paver can be steered more easily, and due to the possible narrow curve radii both when adjusting and when operating the slip-form paver, the paver is maneuverable more conveniently.

Although a preferred embodiment of the invention has been specifically illustrated and described herein, it is to be understood that minor variations may be made in the apparatus without departing from the spirit and scope of the invention, as defined the appended claims.

What is claimed is:

1. A slip-form paver comprising a chassis (2) defined by a frame (4) including a pair of spaced longitudinal beams (8, 8) extending substantially parallel to each other and to the working direction and transverse beams (18, 20) extending substantially normal to the longitudinal beams (8, 8) and to the working direction, a plurality of truck assemblies (14, 15) each including tracks (16), lifting column means (10) for adjusting the heights of said truck assemblies (14, 15), a transverse member (22) mounted to at least one of said transverse beams (18,20) for transverse sliding movement relative thereto and for sliding movement substantially normal to the working direction, and means (17, 24) for mounting at least one of said truck assemblies (14) and its associated lifting column means (10) relative to said slidable transverse member (22).

2. The slip-form paver according to claim 1 wherein the longitudinal beams (8) are arranged to be telescoped and the transverse beams (18, 20) are mounted to the free ends of the longitudinal beams (8).

3. The slip-form paver according to claim 1 wherein the slidable traverse member (22) carries a pivoting device (24) which is pivotable substantially in the plane of the machine frame (4) and is provided to have a conveyer means (28) attached thereto.

4. The slip-form paver according to claim 3 wherein the pivoting device (24) is arranged on the slidable traverse member (22) for displacement transversely to the working direction.

5. The slip-form paver according to claim 3 wherein the pivoting device (24) comprises a parallelogram guiding means.

6. The slip-form paver according to claim 3 wherein the conveyer means (28) is supported on the free end of the pivoting device (24) to be pivoted about an axis extending orthogonally to the plane of the machine frame (4).

7. The slip-form paver according to claim 3 wherein the conveyer means (28) is pivotally supported on the free end of the pivoting device (24) for changing the angle of inclination of the conveyer means (28) about an axis extending in parallel to the plane of the machine frame (4).

8. The slip-form paver according to claim 3 wherein the free end of the pivoting device (24) is provided with an auxiliary frame (26) in which the conveyer means (28) can be displaced in a linear sliding movement in the longitudinal direction.

9. The slip-form paver according to claim 3 wherein the conveyer means (28) can be shortened for transport purposes by pivoting a lower portion (30) of the conveyer means (28).

10. The slip-form paver according to claim 1 wherein at least the front truck assemblies (14) can be adjusted in their track width.

11. The slip-form paver according to claim 1 wherein the machine frame (4) can at least on one side be provided with an auxiliary frame (48) arranged to be telescoped transversely to the working direction and provided for attachment of working devices.

12. The slip-form paver according to claim 11 wherein an intermediate frame (54) is arranged below the machine frame (4).

13. The slip-form paver according to claim 12 wherein the intermediate frame (54) is pivotable by at least 180° about an axis extending orthogonally to the machine frame (4).

14. The slip-form paver according to claim 12 wherein the position of the intermediate frame (54) is adjustable relative to the machine frame (4) in the working direction.

15. The slip-form paver according to claim 11 wherein the auxiliary frame (48) can be telescoped out of the intermediate frame (54).

16. The slip-form paver according to claim 1 wherein the rear truck assemblies (15) on the rear end of the machine frame (4) can be telescoped transversely to the working direction.

17. The slip-form paver according to claim 1 wherein at least the front truck assemblies (14) in the working direction are provided with a steering gear mechanism (32) for pivoting the tracks (16), with the steering angle, to be set relative to the central position in the working direction, being larger than an amount of plus or minus 50° to 60°.

18. The device according to claim 17 wherein the steering gear mechanism (32) comprises first and second curved links (36,40), and wherein the moving plane of the links (36,40) extends orthogonally to the axis of the lifting column (10).

19. The device according to claim 18 wherein the radius of curvature of the links (36,40) is adapted to the diameter of the lifting column (10) for the truck assembly (14).

20. The device according to claim 18 wherein respectively one end of the two links (36,40) is coupled to a respective end of the other link via a common first joint (68) on the free end of the piston rod (64), and the other end of the first link (36) is coupled to a second joint (72) which is stationary relative to the lifting column (10) and the other end of the second link (40) is coupled to a third joint (76) which is stationary relative to the track arrangement (16).

21. The device according to claim 17 wherein the steering gear mechanism (32) comprises an adjustment device provided as a piston-cylinder unit (60) including a cylinder housing (62) and a piston rod (64) arranged for linear movement in the cylinder housing (62).

22. The device according to claim 21 wherein the cylinder housing (62) of the piston-cylinder unit (60) is supported on a portion (11) of the lifting column (10) for pivoting movement about an axis (63) extending orthogonally to the plane of the machine frame (4).

* * * * *